2,913,440

2,6-DIMETHYLSTYRENE POLYMERS

Louis H. Schwartzman and Ben Bennett Corson, Pittsburgh, Pa., assignors to Koppers Company, Inc., a corporation of Delaware No Drawing. Application February 1, 1955
Serial No. 485,582

4 Claims. (Cl. 260—88.1)

This invention relates to 2,6-dimethylstyrene, and its polymeric products. It also relates to a method of preparation of 2,6-dimethylstyrene and its polymeric products.

2,6-dimethylstyrene can be obtained in good yields by dehydrating 2,6-dimethylphenyl methyl carbinol according to the method of Schwartzman and Corson, J.A.C.S. 76: 781 (1954).

A commercially attractive synthesis of 2,6-dimethylphenyl methyl carbinol has now been discovered which involves mono-tertiary-alkylating meta-xylene to 3,5-dimethyl-t-alkylbenzene, acetylating to get 2,6-dimethyl-4-t-alkylacetophenone, hydrogenating to get 2,6-dimethyl-4-t-alkyl-phenyl methyl carbinol and removing the t-alkyl group to get the desired carbinol.

Polymeric products of 2,6-dimethylstyrene include homopolymers and copolymers of 2,6-dimethylstyrene with one or more comonomers containing a $CH_2=C<$ group, such as butadiene, acrylate and methacrylate esters, vinyl chloride and acetate, vinylidene chloride, acrylonitrile, alpha-methylstyrene, other well-known nuclear-substituted styrenes, vinyl naphthalenes, etc., and mixtures of such polymeric products with natural and synthetic rubbers. Notably more heat-resistant, solvent-resistant, much more readily oriented, regular structure polymeric products are thereby afforded, as compared with otherwise similar products prepared with other dimethylstyrenes. As used herein, the term "polymer" includes both homo- and copolymers, while the term "polymeric" includes homo- and co-polymeric substances. Additionally, it is to be understood that the term "co-polymer" includes a polymer of two or more comonomers. Copolymeric products prepared with 5% to 25% 2,6-dimethylstyrene are most generally useful. Higher percentages of 2,6-dimethylstyrene are used where products having even greater heat resistance, increased rigidity or more anisotropic products are desired.

Polymeric products of 2,6-dimethylstyrene are prepared by bulk, solution and suspension or emulsion methods using the well-known free radical or peroxide catalysts. Friedel-Crafts catalysts of the type including $BF_3$, $SnCl_4$, $AlCl_3$, $H_2SO_4$, etc. and complexes are used in bulk and solution processes. In polymerizing with a Friedel-Crafts type catalyst, such as $BF_3$ or a complex thereof, from 0.1% to 5% by weight, monomer basis, is advantageously used at a controlled temperature within the range of about —80° C. to about +80° C. When solution polymerization is utilized, it is found that the rate of polymerization and molecular weight of product increase with increasing dielectric constant of the solvent used.

The following examples are given for purpose of illustration only, parts and percentages given being parts and percentages by weight unless otherwise noted.

*Example 1.—Preparation of 2,6-dimethylstyrene*

(a) t-Butylchloride (795 g., 8.6 m.) is added over 6.3 hours to a stirred solution of 96% m-xylene (2000 g., 18.9 m.) and anhydrous ferric chloride (100 g., 0.6 m.) at 0° C. An m-p-xylene mixture can be used instead of m-xylene since the para isomer is not alkylated under these conditions. The mixture is heated and stirred at 80° C. for 15 hours. Water (200 ml.) is added to the reaction product and the mixture is steam distilled. The organic layer is separated, dried and distilled to give 1250 g. (90% yield) of 3,5-dimethyl-t-butylbenzene (97% pure) boiling at 200–204° C. at atmospheric pressure.

(b) A solution of 3,5-dimethyl-t-butylbenzene (150 g., 0.94 m.) and acetyl chloride (290 g., 3.7 m.) in carbon disulfide (700 ml.) is stirred at 30° C. and anhydrous aluminum chloride (202 g., 1.5 m.) is added during 3 hours. After stirring for an additional 3 hours, the mixture is decomposed with ice and hydrochloric acid. The organic layer is separated, washed with water until neutral and dried. Distillation of the dried solution gives 167 g. (88% yield) of 2,6-dimethyl-4-t-butyl-acetophenone boiling at 144–148° C./20 mm.; freezing temperature 46.10° C.

(c) 2,6-dimethyl-4-t-butylacetophenone (237 g., 1.2 m.) in anhydrous ether (1300 ml.) is added to a stirring mixture of lithium aluminum hydride (29.0 g., 0.75 m.) in anhydrous ether (500 ml.) at such a rate that a gentle reflux is maintained. After stirring at 30° C. for an additional 2 hours, the reaction product is cooled to 0° C. and the complex is decomposed with water. The ether layer is separated, dried and concentrated to give 228 g. (95% yield) of 2,6-dimethyl-4-t-butylphenyl methyl carbinol; F.T. 113.22° C. The above reduction can also be effected catalytically. Reduction of the ketone in methanol with a Pd-C catalyst under 100 p.s.i.g. of hydrogen and at 30° C. gives a 90% yield of the corresponding carbinol.

(d) A solution of 2,6-dimethyl-4-t-butylphenyl methyl carbinol (50 g., 0.25 m.) in benzene (100 ml.) is passed over a clay type catalyst (Attapulgus clay) at 450° C., atmospheric pressure, and a liquid hourly space velocity of 2.5. The catalyzate is dried and distilled to give 20 g. (60% yield) of 2,6-dimethylstyrene boiling at 66–70° C./10 mm.

2,6-dimethylstyrene of 99.4 mole percent purity has the following properties: B.P. 65.8–66.0° C./10 mm.; F.T. —38.65° C.; $n_D^{20}$ 1.5314;

$$d_{20}^{20}\ 0.9094$$

*Analysis.*—Calcd. for $C_{10}H_{12}$: C, 90.8; H, 9.15. Found: C, 91.1; H, 9.25.

*Example 2.—Polymerization of 2,6-dimethylstyrene*

To 100 parts 2,6-dimethylstyrene at 0° C. is added with stirring 0.4 part $BF_3$-ether complex containing 45% $BF_3$. When the exotherm subsides, there is recovered a hard, solid polymer which, when molded in the form of a bar, has excellent heat distortion resistance, the heat distortion temperature being about 225–235° F.

*Example 3.—Copolymerization of 2,6-dimethylstyrene and styrene*

The procedure of Example 2 is repeated, using as comonomers 75% styrene and 25% 2,6-dimethylstyrene with advantageous results, to give products particularly useful for affording molding compounds having remarkable heat distortion resistance.

As compared with similar products prepared with available isomeric dimethylstyrenes under procedures otherwise the same, polymeric products prepared with 2,6-dimethylstyrene are far superior with respect to heat distortion resistance, solvent resistance, and ease in orientating films or fibers.

What is claimed is:

1. Method of making a hard, solid polymer from a polymerizable material selected from the group consisting of 2,6-dimethylstyrene and monomeric mixtures of 2,6-dimethylstyrene and styrene, said mixtures containing from 5 to 25% by weight 2,6-dimethylstyrene, comprising intimately contacting said polymerizable material with a $BF_3$-ether complex containing about 45% $BF_3$ at a temperature of about 0° C. until the resulting exothermic reaction subsides, said $BF_3$ being present in the reaction mixture in an amount equal to 0.1–5% by weight.

2. Method of making a hard, solid polymer of 2,6-dimethylstyrene comprising intimately contacting 2,6-dimethylstyrene with a $BF_3$-ether complex containing about 45% $BF_3$ at a temperature of about 0° C. until the resulting exothermic reaction subsides, said $BF_3$ being present in the reaction mixture in an amount equal to 0.1–5% by weight.

3. A hard, solid homopolymer of 2,6-dimethylstyrene having a heat distortion temperature of 225–235° F.

4. A hard, solid copolymer containing 5–25% by weight 2,6-dimethylstyrene and 95–75% by weight styrene.

References Cited in the file of this patent

UNITED STATES PATENTS

| | | |
|---|---|---|
| 2,399,395 | Shriver | Apr. 30, 1946 |
| 2,482,207 | Quattlebaum | Sept. 20, 1949 |
| 2,491,116 | Kraus et al. | Dec. 13, 1949 |
| 2,555,298 | Sturrock | May 29, 1951 |
| 2,563,611 | Miller et al. | Aug. 7, 1951 |
| 2,590,771 | Jordan et al. | Mar. 25, 1952 |
| 2,591,587 | Mowry | Apr. 1, 1952 |
| 2,600,782 | Kropa | June 17, 1952 |
| 2,618,628 | Hayes | Nov. 18, 1952 |